US010891664B2

(12) United States Patent
Fang et al.

(10) Patent No.: US 10,891,664 B2
(45) Date of Patent: Jan. 12, 2021

(54) SYSTEM AND METHOD FOR FACILITATING NON-PARAMETRIC WEIGHTED CORRELATION ANALYSIS

(71) Applicant: Medallia, Inc., Palo Alto, CA (US)

(72) Inventors: Ji Fang, Mountain View, CA (US);
Po-Yu Li, Mountain View, CA (US);
Jiacong He, Sunnyvale, CA (US)

(73) Assignee: Medallia, Inc., San Mateo, CA (US)

( * ) Notice: Subject to any disclaimer, the term of this patent is extended or adjusted under 35 U.S.C. 154(b) by 148 days.

(21) Appl. No.: 15/427,998

(22) Filed: Feb. 8, 2017

(65) Prior Publication Data

US 2018/0225728 A1    Aug. 9, 2018

(51) Int. Cl.
*G06Q 30/02* (2012.01)
*G06Q 10/06* (2012.01)
*G06Q 30/06* (2012.01)
*G06Q 10/10* (2012.01)

(52) U.S. Cl.
CPC ................ *G06Q 30/0282* (2013.01)

(58) Field of Classification Search
CPC .................................. G06Q 30/0282
USPC ........................... 705/1.1–912, 347
See application file for complete search history.

(56) References Cited

U.S. PATENT DOCUMENTS

2005/0209820 A1* 9/2005 Inoue ................ G05B 23/0232
                                             702/183
2005/0222906 A1* 10/2005 Chen ..................... G06Q 30/02
                                             705/14.41
2010/0211909 A1* 8/2010 Ghanekar ............... G06F 16/29
                                             715/788
2011/0066472 A1* 3/2011 Scheider ............... G06Q 10/06
                                             705/7.29
2016/0232537 A1* 8/2016 Nonez ............... G06F 16/24578

OTHER PUBLICATIONS

Michael Luca, "Reviews, Reputation, and Revenue: The Case of Yelp.com" Working Paper 12-016 at Harvard Business School, downloaded on Sep. 29, 2018 and first available on the Internet Apr. 18, 2016 as shown on the WaybackMaching noted below. (Year: 2016).*

(Continued)

*Primary Examiner* — Jonathan P Ouellette

(57) ABSTRACT

One embodiment provides a system that obtains, for a business entity, review and revenue information for a period of time from network packets, and extracts rankings and revenues from the review and revenue information. The system determines respective correspondence between the rankings and revenues for a plurality of points of time. The system determines first and second normalized rankings for first and second points of time, respectively, in the plurality of points of time. The system determines first and second normalized revenues for the first and second points of time, respectively. The system calculates a first correlation strength between the changes in the first and second normalized rankings, and the changes in the first and second normalized revenues. The system computes a correlation between the rankings and corresponding revenues based on a plurality of correlation strengths, which includes the first correlation strength, over the period of time.

20 Claims, 10 Drawing Sheets

(56) References Cited

OTHER PUBLICATIONS

Michael Luca, "Reviews, Reputation, and Revenue: The Case of Yelp.conn" Working Paper 12-016 at Harvard Business School, downloaded on Sep. 29, 2018 and first available on the Internet Apr. 18, 2016 as shown on the WaybackMaching noted below. (Year: 2016).*

Jedelyn Cabrieto & Francis Tuerlinckx & Peter Kuppens & Mariel Grassmann & Eva Ceulemans, "Detecting correlation changes in multivariate time series: a comparison of four non-parametric change point detection methods", Behav Res (2017) 49:988-1005 published online Jul. 6, 2016 (Year: 2016).*

Zenon Gniazdowski, "Geometric interpretation of a correlation", Zeszyty Naukowe Warszawskiej Wyższej Szkoły Informatyki Nr 9, Rok 7, 2013, s. 27-35 (Year: 2013).*

* cited by examiner

SYSTEM AND METHOD FOR FACILITATING NON-PARAMETRIC WEIGHTED CORRELATION ANALYSIS

BACKGROUND

Field

This disclosure is generally related to user review analysis. More specifically, this disclosure is related to a method and system for non-parametric weighted correlation analysis.

Related Art

With the advancement of the computer and network technologies, various operations performed by users from different applications lead to extensive use of web services. This proliferation of the Internet and Internet-based user activity continues to create a vast amount of digital content. For example, multiple users may concurrently provide reviews (e.g., fill out surveys) about a business entity (e.g., a hotel or a restaurant) via different applications, such as mobile applications running on different platforms, as well as web-interfaces running on different browsers in different operating systems. Furthermore, users may also use different social media outlets to express their reviews about the business entity.

An application server for the business entity may store the reviews in a local storage device. A large number of users providing reviews can lead to a large quantity of data for the application server, which may not be possible for humans to identify and process. To resolve this, different correlation analysis techniques can be applied to obtain overall insight into the user reviews, either by analyzing different aspects of the reviews or by analyzing the correlation between the user reviews and other business operational data, such as revenue information. However, these correlation analysis techniques are typically parametric, which rely on a strong assumption on the distribution of the data. For example, a linear-regression-based approach assumes that the data distribution is linear. As a result, these correlation analysis techniques may fail to capture correlation that does not follow a distribution (e.g., if the correlation coefficients are not positive, the linear-regression-based approach may determine that there is no correlation even though there is a possibility of a non-linear correlation).

Although a number of methods are available for correlation analysis, some problems still remain in the analysis of user reviews.

SUMMARY

One embodiment provides a system that performs non-parametric correlation analysis. During operation, the system obtains, for a business entity, review and revenue information for a period of time from one or more network packets, and extracts rankings and revenues for a period of time from the review and revenue information. The system determines respective correspondence between the rankings and revenues for a plurality of points of time in the period of time. The system determines a first normalized ranking and a second normalized ranking for a first point of time and a second point of time, respectively, in the plurality of points of time from the extracted rankings. The system also determines a first normalized revenue and a second normalized revenue for the first point of time and the second point of time, respectively, from the extracted revenues. The system calculates a first correlation strength between the changes in the first and second normalized rankings and the changes in the first and second normalized revenues based on the correspondence between rankings and revenues. The system then computes a correlation between the extracted rankings and corresponding extracted revenues based on a plurality of correlation strengths, which includes the first correlation strength, over the period of time.

In a variation on this embodiment, the system determines the first normalized ranking by determining a set of business entities similar to the business entity and calculating a relative ranking of the business entity compared to rankings of members of the set of business entities based on an original ranking of the business entity at the first point of time in the obtained rankings. The system then computes the first normalized ranking based on the relative ranking and a cardinality of the set of business entities.

In a further variation, the set of business entities has price ranges and locations similar to the business entity.

In a variation on this embodiment, the system determines the first normalized revenue by determining, for the business entity, a maximum and a minimum revenue for the period of time based on the obtained revenue and obtaining an original revenue of the business entity at the first point of time from the obtained revenues. The system then computes the first normalized revenue based on the original revenue, and the maximum and minimum revenues of the business entity.

In a variation on this embodiment, the system computes the correlation over the period of time by computing an average, minimum, maximum, or median of the plurality of correlation strengths over the period of time.

In a variation on this embodiment, the system determines a first correlation strength by determining a correlation type for the changes in the first and second normalized rankings and the changes in the first and second normalized revenues and determining a correlation strength calculation method based on the correlation type. The system then computes the first correlation strength based on the determined correlation strength calculation method.

In a further variation, the correlation strength calculation method is a penalty-based correlation strength calculation method comprising a first computation method for a positive correlation type and a second computation method for a negative correlation type. The first and second computation methods include computing the first correlation strength based on a first angle and a second angle. The first angle is between a first vector representing the changes in the first and second normalized rankings and a second vector representing the changes in the first and second normalized revenues. The second angle is between the second vector and a third vector representing an average revenue change for a set of business entities similar to the business entity at the first and second points of time.

In a further variation, the correlation strength calculation method is a binary correlation strength calculation method comprising a third computation method for a positive correlation type and a zero value for a negative correlation type. The third computation method includes computing the first correlation strength based on an absolute value of the difference between the changes in the first and second normalized rankings and the changes in the first and second normalized revenues.

BRIEF DESCRIPTION OF THE FIGURES

In the figures, like reference numerals refer to the same figure elements.

DETAILED DESCRIPTION

Figure 1A:
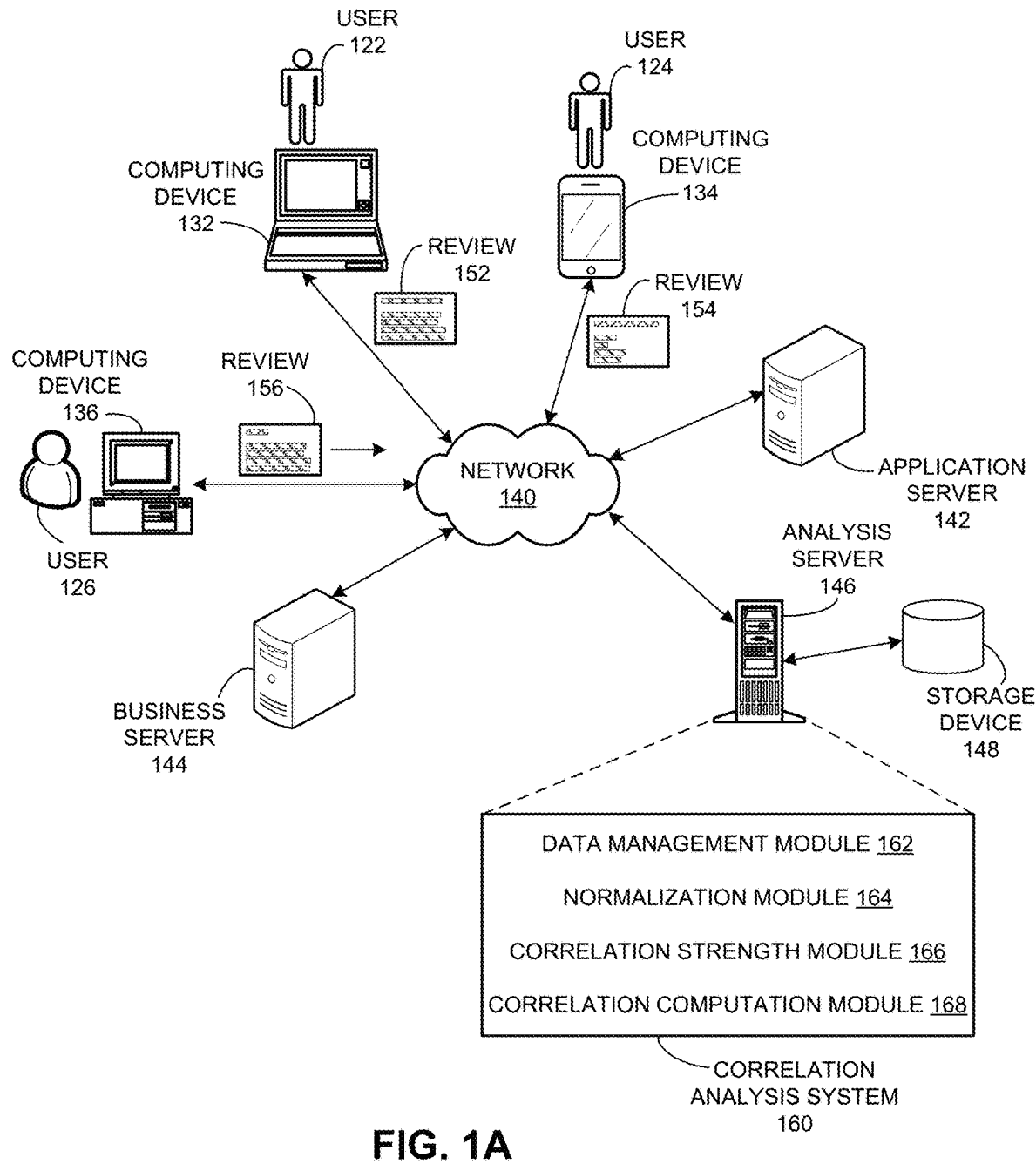
FIG. 1A illustrates an exemplary non-parametric correlation analysis system, in accordance with an embodiment of the present invention.

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

Overview

Embodiments of the present invention provide a system, which performs non-parametric correlation analysis in user reviews. Due to ease of access via the Internet, a large number of users provide reviews about a business entity. Such reviews can include surveys (e.g., regarding customer experience) comprising ranking data (e.g., on a scale of 1-10, how would you rate the cleanliness of the guestroom), and textual comments (e.g., a social media post). Based on the reviews, a correlation analysis system tries to determine whether the social reputation of a business entity (e.g., a Yelp or TripAdvisor ranking) correlates with the revenue (e.g., more dining or guest booking). More specifically, such a system may determine how the changes in ranking relate to the changes in revenue.

However, with existing technologies, the correlation analysis techniques use parametric modeling approaches. Usually these approaches assume a distribution for the correlation between ranking and revenue data for observation. However, real world data usually does not follow a specific distribution (e.g., linear or exponential distribution). For example, techniques based on linear regression and exponential kernel function assume that the data distributions are linear and exponential, respectively. Under such assumptions, if the correlation does not follow a linear or exponential distribution, the techniques may not discover any correlation between the review and revenue data. However, in reality, it is still possible that there is a correlation between ranking and revenue data. Therefore, real world data may not distribute in the way the parametric modeling approaches expect.

To solve this problem, embodiments of the present invention provide a system that facilitates parametric correlation analysis on a large set of user ranking and corresponding revenue information for a business entity. Unlike conventional approaches, the system does not assume how the data should distribute. Instead, the system obtains user review information, which can include corresponding rankings, for a business entity from one or more distributed services (e.g., TripAdvisor, Facebook, Twitter, Yelp, etc.) over a period of time. The system then calculates correlation strength for each data point. Each data point can represent the change in rankings and the corresponding change in revenue at two points of time. This way, the system can reliably calculate correlation strength for real world data.

Correlation Analysis System

FIG. 1A illustrates an exemplary non-parametric correlation analysis system, in accordance with an embodiment of the present invention. In this example, a large number of users 122, 124, and 126 of a business entity provide reviews 152, 154, and 156, respectively, about the business entity via a variety of computing devices 132, 134, and 136, respectively. Examples of a review include, but are not limited to, a survey with numerical indicators, a social media post, and a review posted on a website. Such a business entity can be an entity in the hospitality business (e.g., a hotel, an event management company, a theme park, a transportation service provider, a cruise line, etc.).

These computing devices are coupled via a network 140, which can be a local or wide area network, to an application server 142 that provides a distributed service (e.g., TripAdvisor, Facebook, Twitter, Yelp, etc.). It should be noted that these reviews can be hosted on different servers associated with the corresponding service. The business entity can maintain a business server 144 coupled to network 140. Business server 144 can store the earning information of the entity. Such information can include earnings of the business entity over a period of time.

With existing technologies, correlation analysis techniques use parametric modeling approaches to determine correlation from reviews 152, 154, and 156, and corresponding revenues. Usually these approaches assume a distribution for the correlation between ranking information in reviews 152, 154, and 156 and the corresponding revenue data. However, the correlations between rankings in reviews 152, 154, and 156 and the corresponding revenue data usually do not follow a specific distribution. For example, if the correlation does not follow a linear or exponential distribution, the techniques may not discover any correlation between the rankings in reviews 152, 154, and 156 and the corresponding revenues. However, in reality, there might be a correlation between the rankings and the corresponding revenues. Therefore, such techniques may not be able to determine a proper correlation from the rankings in reviews 152, 154, and 156 and the corresponding revenues.

To solve this problem, embodiments of the present invention provide a correlation analysis system 160 that facilitates non-parametric correlation analysis between the rankings in reviews 152, 154, and 156 and the corresponding revenues. System 160 can run on an analysis server 146. Unlike conventional approaches, system 160 does not assume how the data should distribute. Instead, system 160 calculates correlation strength for each data point representing the change in rankings and the corresponding change in revenue at two points of time. This is why, system 160 can reliably calculate correlation strength for real world data.

In some embodiments, system 160 can include a data management module 162, a normalization module 164, a correlation strength module 166, and a correlation computation module 168. During operation, data management module 162 obtains user review information over a period of time from application server 142. Data management module 162 can send a request for the user reviews to application server 142, which, in turn, provides the requested user review information to system 160. User review information can include reviews and rankings from multiple distributed services. It should be noted that data management module 162 can obtain review information associated with different distributed services from different corresponding application servers.

Data management module 162 can also send a request for earning information to business server 144, which, in turn, provides the requested earning information to system 160. Upon receiving the user reviews and earning information, data management module 162 extracts rankings and revenues from the user reviews and earning information, and hosts them in a storage device 148. Sending a request can include sending one or more network packets comprising the requests. Similarly, receiving the review and/or revenue information can include receiving one or more network packets comprising the review and/or revenue information.

Data management module 162 then determines a correspondence between a respective ranking and a corresponding revenue information. For example, data management module 162 determines a ranking for the business entity at a point of time from the reviews hosted in storage device 148. Similarly, data management module 162 determines the revenue of the business entity at the same point of time from the revenue information hosted in storage device 148. It should be noted that such ranking or revenue can be a statistical value (e.g., a mean or a median) of data over a period of time. For example, a ranking on a Sunday can be the average ranking for the business entity for the preceding week. In that case, the revenue information on a Sunday can be the average revenue for the business entity for the preceding week.

In this way, data management module 162 establishes respective correspondences between the ranking and revenue information, which are obtained from different sources (e.g., an application server and a business server, respectively). In some embodiments, data management module 162 can determine a type for the reviews for normalization. For example, data management module 162 can determine whether a review is from a particular service and ensures the reviews are normalized within the same type of review.

Normalization module 164 calculates a relative ranking of a respective entity compared to similar business entities. Normalization module 164 then normalizes the relative ranking based on the relative ranking and the number (i.e., the cardinality) of similar business entities. Furthermore, normalization module 164 calculates normalized revenue at a point of time based on the revenue at that point of time, and the maximum and minimum revenue for the entity over that period of time.

Correlation strength module 166 then determines the correlation strength for the normalized ranking and revenue for an interval (e.g., for two points of time) in the period of time. In this way, correlation strength module 166 can generate the correlation strengths for a set of time intervals (e.g., daily, weekly, monthly, yearly, etc.) over the period of time. To determine the correlation between ranking and revenue for the entity, correlation computation module 168 computes the correlation over a period of time. Computing the correlation over a period of time includes, but is not limited to, computing an average, minimum, maximum, or median of the correlation strengths over the period of time. In this way, system 160 can calculate the real-life correlation between the ranking and revenue for a respective entity.

Figure 1B:
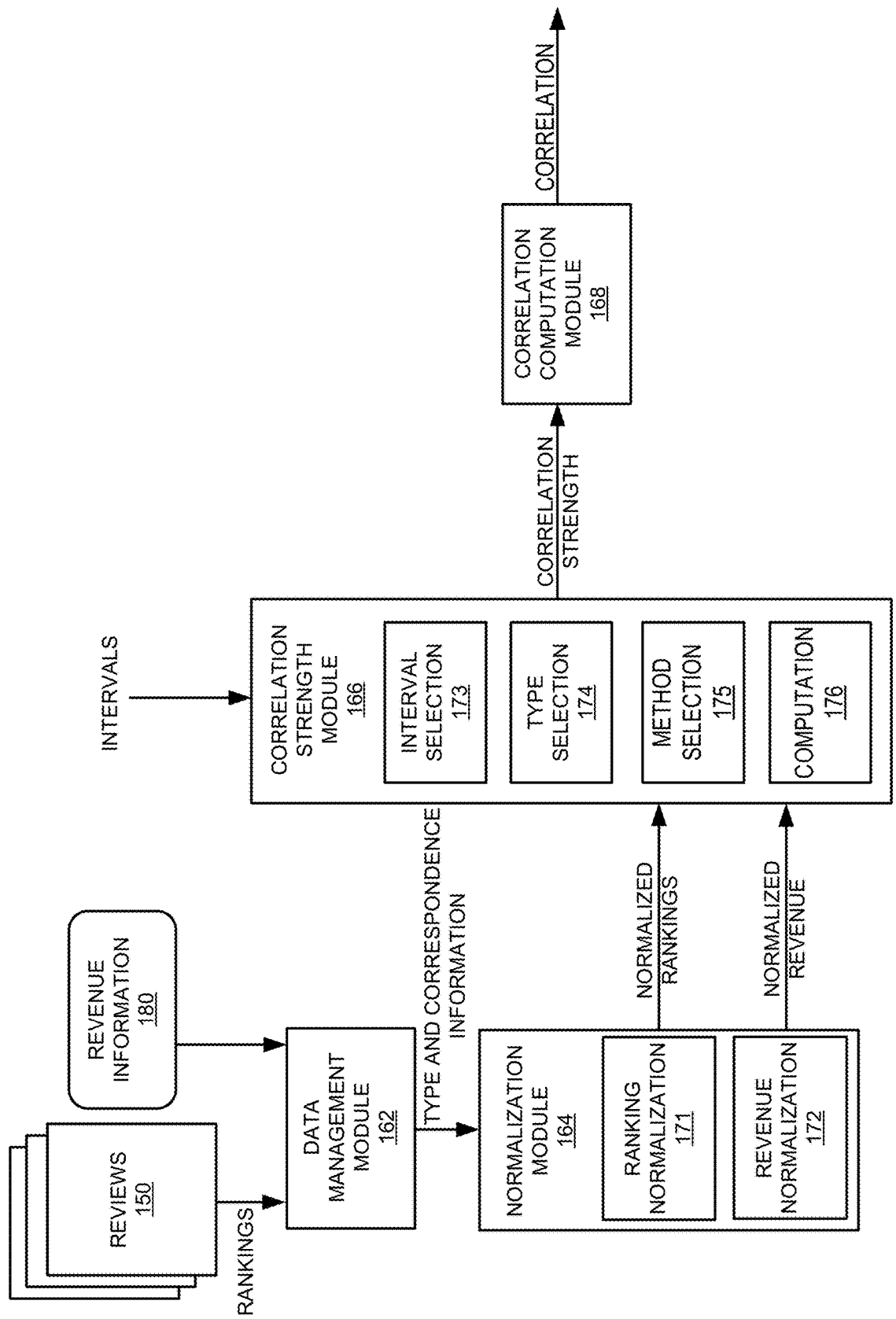
FIG. 1B illustrates exemplary components of a non-parametric correlation analysis system, in accordance with an embodiment of the present invention.

FIG. 1B illustrates exemplary components of a non-parametric correlation analysis system, in accordance with an embodiment of the present invention. In this example, data management module 162 obtains ranking information from a large set of reviews 150. Reviews 150 can be reviews of a business entity over a period of time and can include rankings for the business entity. Data management module 162 also obtains revenue information 180 (e.g., revenue of the business entity over the period of time). Data management module 162 determines a correspondence between a respective ranking and a corresponding revenue information. Data management module 162 can also determine a type for the reviews for normalization. Data management module 162 can provide the determined type and correspondence information to normalization module 164.

In some embodiments, normalization module 164 includes a ranking normalization mechanism 171, which determines a set of similar business entities. Such calculation can include removal of rankings that are not similar business entities (e.g., are not competitors of the entity). Similar business entities can be determined as the competitors of the entity with similar price ranges and locations. Ranking normalization mechanism 171 calculates a relative ranking for an entity compared to the similar business entities. Ranking normalization mechanism 171 then normalizes the relative ranking based on the relative ranking and the number (i.e., the cardinality) of similar business entities. For example, normalized ranking can be calculated as (cardinality−relative_ranking)/cardinality. The normalized ranking can fall within [0, 1].

Furthermore, normalization module 164 also includes a revenue normalization mechanism 172, which obtains revenues for the entity for a period of time (e.g., for a year). Revenue normalization mechanism 172 then calculates the normalized revenue at a respective point of time based on the revenue at that point of time, and the maximum and minimum revenue for the period of time. For example, the normalized revenue at time t can be calculated as (revenue(t)−minimum_revenue)/(maximum_revenue−minimum_revenue). In this way, normalization module 164 determines the normalized rankings and revenues for an entity.

Correlation strength module 166 receives the normalized rankings and revenues. Correlation strength module 166 includes an interval selection mechanism 173, which determines an interval for correlation calculation. This interval can represent two points of time for which normalized ranking and revenue information is available. In some embodiments, interval selection mechanism 173 can receive a selection of interval from a configuration or from a user input (e.g., from a command-line or graphical interface).

Correlation strength module 166 also includes a type selection mechanism 174, which determines the correlation type (e.g., positive or negative) for the normalized ranking and revenue for the interval. Correlation strength module 166 further includes a method selection mechanism 175, which determines a calculation method for correlation strength for the normalized ranking and revenue for the interval. Correlation strength module 166 also includes a computation mechanism 176, which computes the correlation strength using the selected method.

In this way, correlation strength module 166 can generate the correlation strengths for a set of time intervals (e.g., daily, weekly, monthly, yearly, etc.) over the period of time. In some embodiments, a respective correlation strength value is a weighted value between 0 and 1. To determine the correlation between ranking and revenue for the entity, correlation computation module 168 computes the correlation over the period of time. For example, correlation computation module 168 can calculate the correlation of ranking and corresponding revenue for a business entity by computing an average, minimum, maximum, or median of the correlation strengths over the period of time.

Figure 2:
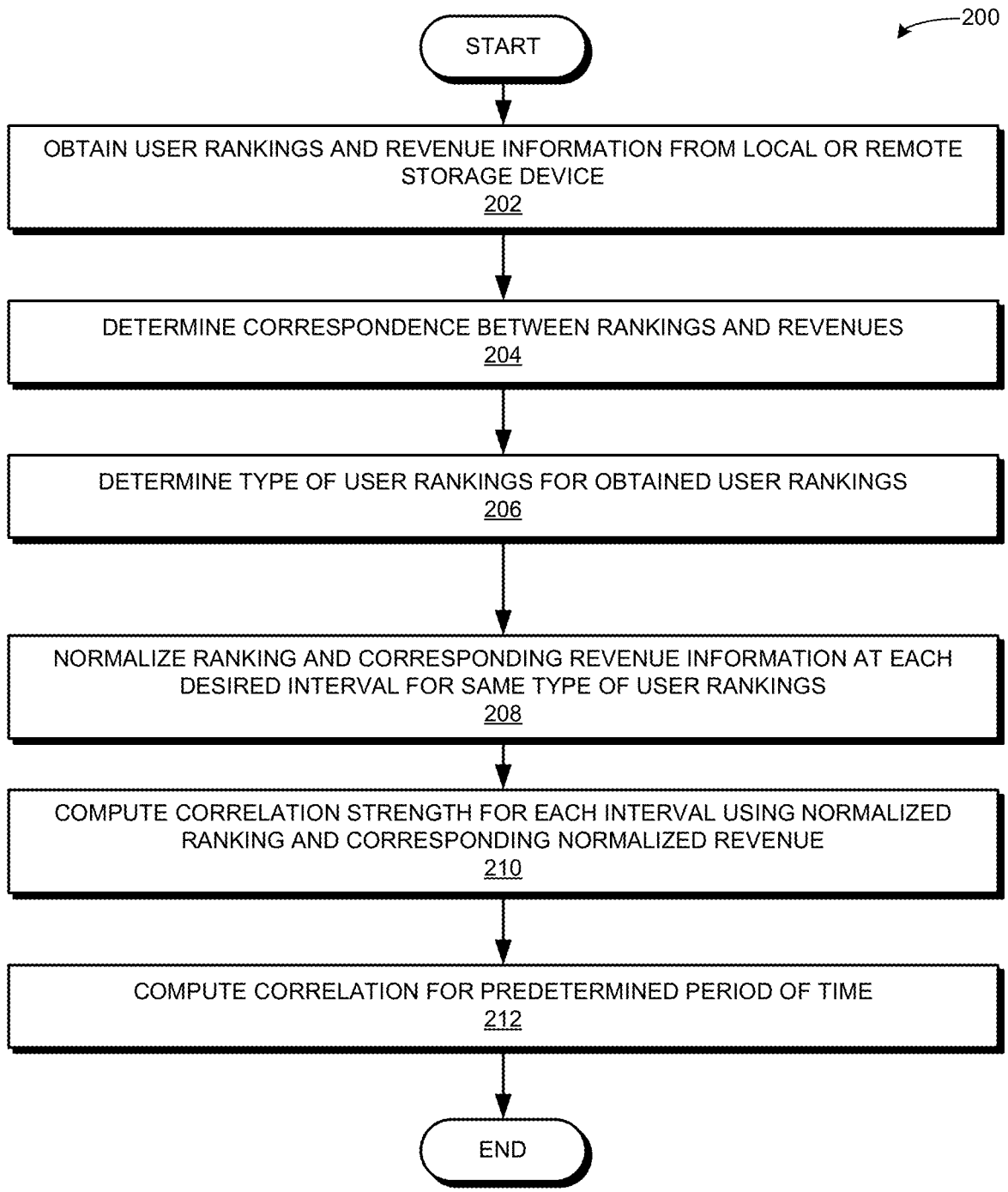
FIG. 2 presents a flowchart illustrating a method for non-parametric correlation analysis in user reviews, in accordance with an embodiment of the present invention.

FIG. 2 presents a flowchart 200 illustrating a method for non-parametric correlation analysis in user reviews, in accordance with an embodiment of the present invention. During operation, a non-parametric correlation analysis system obtains user rankings and corresponding revenue information from a local or a remote storage device (operation 202) (e.g., from an application server). Such rankings can include rankings from multiple distributed services. The system determines a correspondence (e.g., a relationship) between the rankings and the revenues (operation 204). The system can also determine a type of user rankings for the obtained user rankings (operation 206).

The system then normalizes the ranking and corresponding revenue information at each desired interval for the same type of user rankings (operation 208). For example, the system can determine whether a review is from a particular service and ensures the rankings are normalized within the same type of rankings (e.g., within Yelp rankings). The system then computes the correlation strength for each interval using the normalized ranking and the corresponding normalized revenue (operation 210). The system then computes the correlation for a predetermined period of time (operation 212).

Non-Parametric Correlation Analysis

Figure 3A:
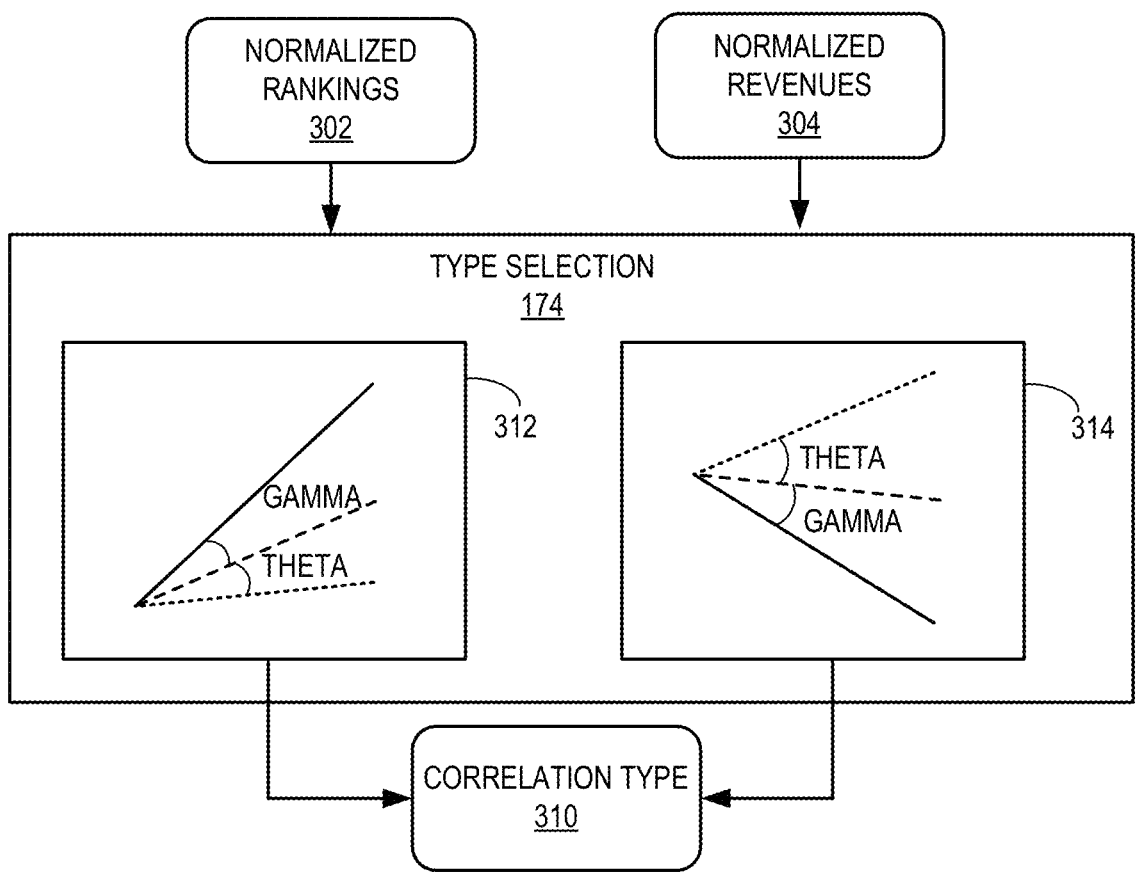
FIG. 3A illustrates an exemplary correlation type selection mechanism of a non-parametric correlation analysis system, in accordance with an embodiment of the present invention.

FIG. 3A illustrates an exemplary correlation type selection mechanism of a non-parametric correlation analysis system, in accordance with an embodiment of the present invention. For an entity, type selection mechanism 174 takes normalized rankings 302 and normalized revenues 304 for an interval as inputs. Type selection mechanism 174 determines the respective changes in normalized rankings 302 and normalized revenues 304. If both the changes are positive or both the changes are negative, type selection mechanism 174 determines that the correlation type 310 is a positive correlation (type 312). Otherwise, type selection mechanism 174 determines that the correlation type 310 is a negative correlation (type 314).

In this example, type selection mechanism 174 calculates an angle theta, which is the angle between a vector representing the changes in normalized revenues 304 and a vector representing the changes in normalized rankings 302. In some embodiments, type selection mechanism 174 calculates an angle gamma, which is the angle between a vector representing the changes in normalized revenues 304 and a vector representing the average revenue change for the set of similar entities for the interval. Type selection mechanism 174 then determines the correlation type 310 based on theta and gamma (e.g., either type 312 or 314).

Figure 3B:
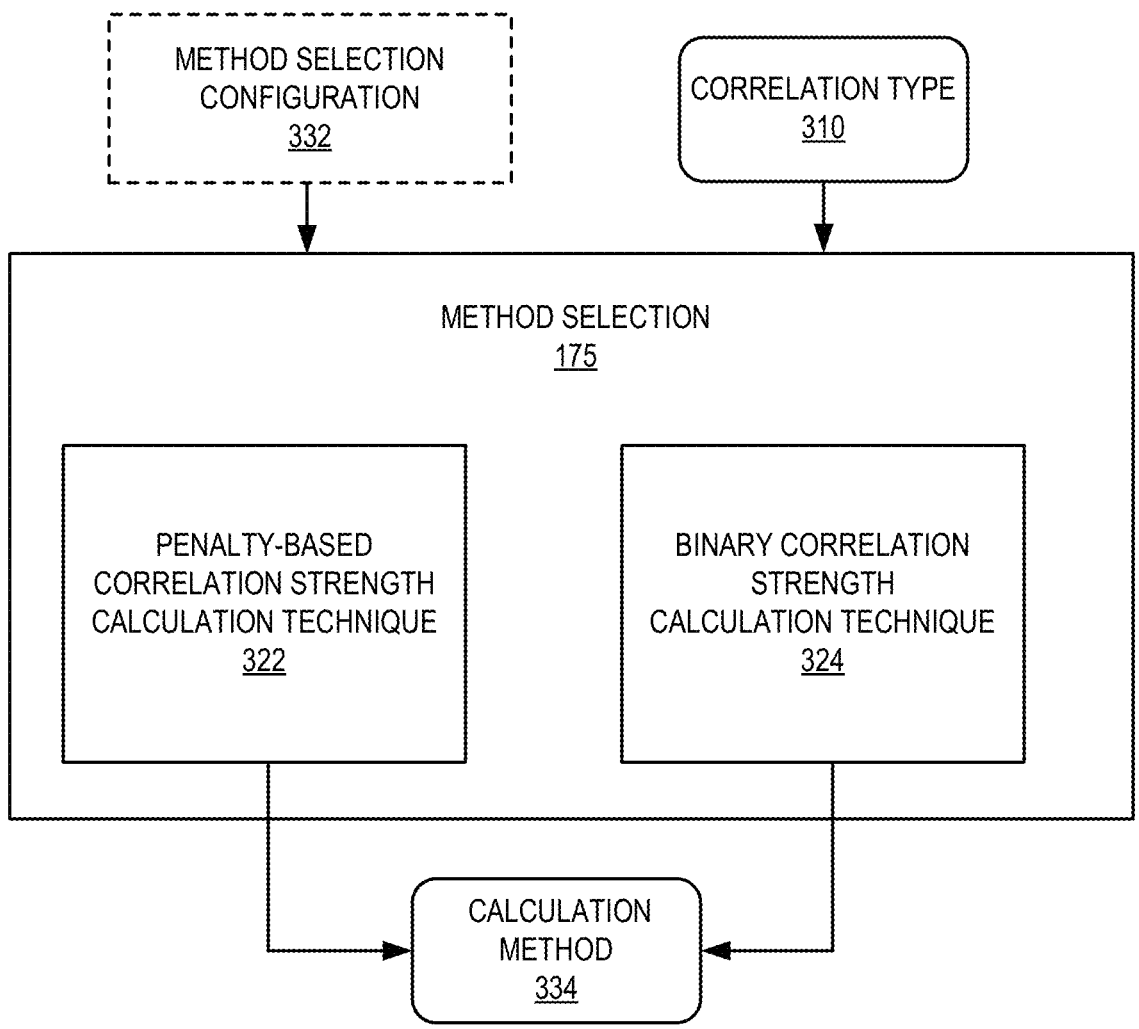
FIG. 3B illustrates an exemplary calculation method selection mechanism of a non-parametric correlation analysis system, in accordance with an embodiment of the present invention.

FIG. 3B illustrates an exemplary calculation method selection mechanism of a non-parametric correlation analysis system, in accordance with an embodiment of the present invention. In this example, method selection mechanism 175 receives the correlation type 310 as an input. Method selection mechanism 175 can also take method selection configuration 332 as an input. Configuration 332 can specify which calculation technique method selection mechanism 175 may choose. Method selection mechanism 175 then determines a calculation method 334.

For example, method selection mechanism 175 can select penalty-based correlation strength calculation technique 322 as calculation method 334. Technique 322 can calculate the correlation strength as (90−theta−gamma)/90 if correlation type 310 indicates a positive correlation. Similarly, technique 322 can calculate the correlation strength as −(theta−gamma)/90 if correlation type 310 indicates a negative correlation. In some embodiments, theta is an unsigned quantity (always non-negative) and gamma is a signed quantity. Gamma is positive when an entity underperforms the average and negative when an entity outperforms the average. Therefore, gamma can be viewed as a penalty. It should be noted that technique 322 may require a choice of time interval that can influence the vectors (as described in conjunction with FIG. 3A) and calculated correlation strength.

On the other hand, method selection mechanism 175 can select binary correlation strength calculation technique 324 as calculation method 334. Technique 324 can calculate the correlation strength as 1−ABS(delta_r−delta_b) if correlation type 310 indicates a positive correlation. Here, ABS indicates a function returning an absolute value. Furthermore, delta__r is the change in normalized rankings for the interval, and delta__b is the change in normalized revenues for the interval. It should be noted that, for technique 324, the change in normalized revenue can be calculated by a difference in normalized revenues for the points of time indicated by the interval. If correlation type 310 indicates a negative correlation, the correlation strength is 0.

Operations

Figure 4A:
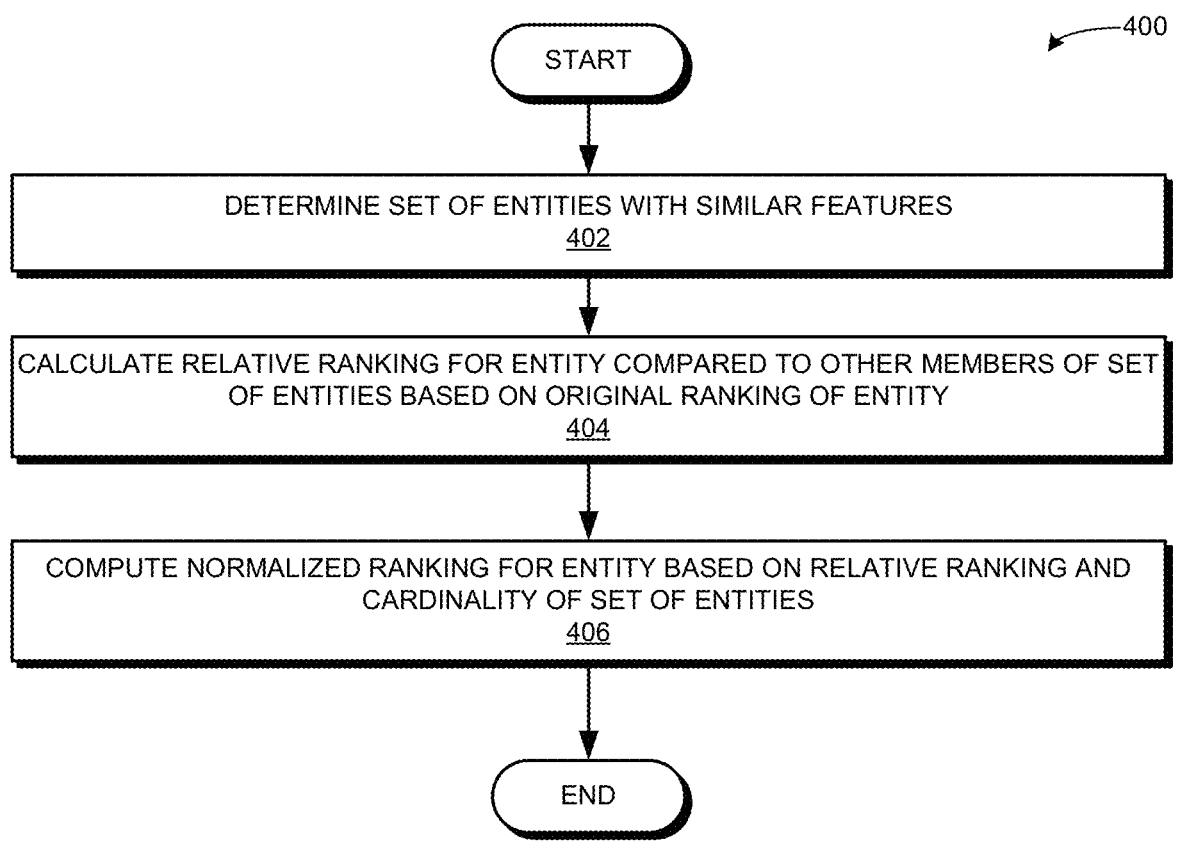
FIG. 4A presents a flowchart illustrating a method for computing normalized ranking for non-parametric correlation analysis, in accordance with an embodiment of the present invention.

FIG. 4A presents a flowchart illustrating a method for computing normalized ranking for non-parametric correlation analysis, in accordance with an embodiment of the present invention. During operation, a non-parametric correlation analysis system determines a set of entities with similar features (e.g., with similar price range and location) (operation 402). The system calculates a relative ranking for an entity compared to the other members of the set of entities based on the original ranking of the entity (operation 404). The system then computes a normalized ranking for the entity based on the relative ranking and the cardinality of the set of entities (operation 406).

Figure 4B:
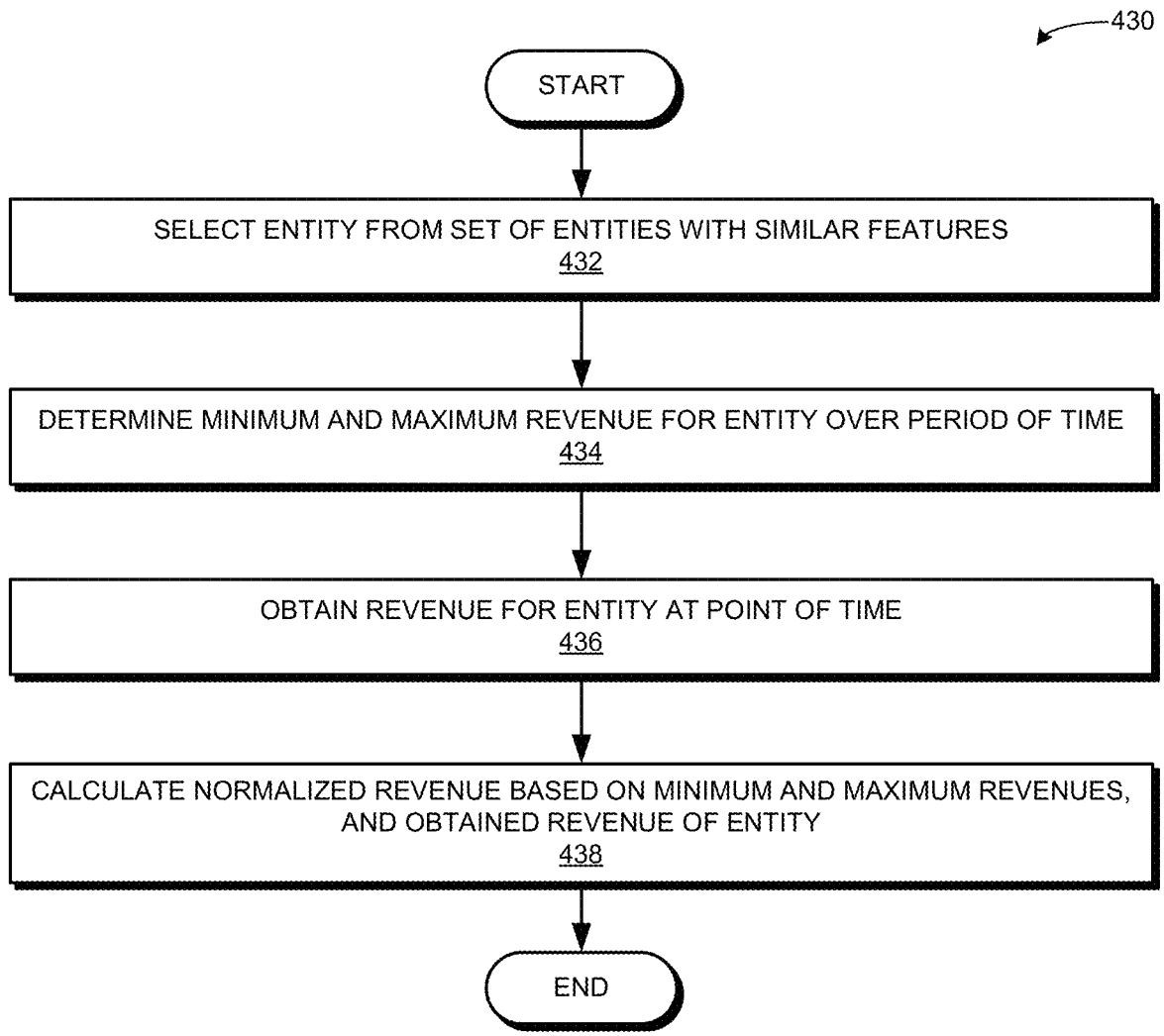
FIG. 4B presents a flowchart illustrating a method for computing normalized revenue for non-parametric correlation analysis, in accordance with an embodiment of the present invention.

FIG. 4B presents a flowchart illustrating a method for computing normalized revenue for non-parametric correlation analysis, in accordance with an embodiment of the present invention. During operation, a non-parametric correlation analysis system selects an entity from a set of entities with similar features (operation 432) and determines a minimum revenue and a maximum revenue for the entity over a period of time (operation 434). The system then obtains the revenue for the entity at a point of time (operation 436) and calculates the normalized revenue based on the minimum and maximum revenues, and the obtained revenue of entity (operation 438).

Figure 4C:
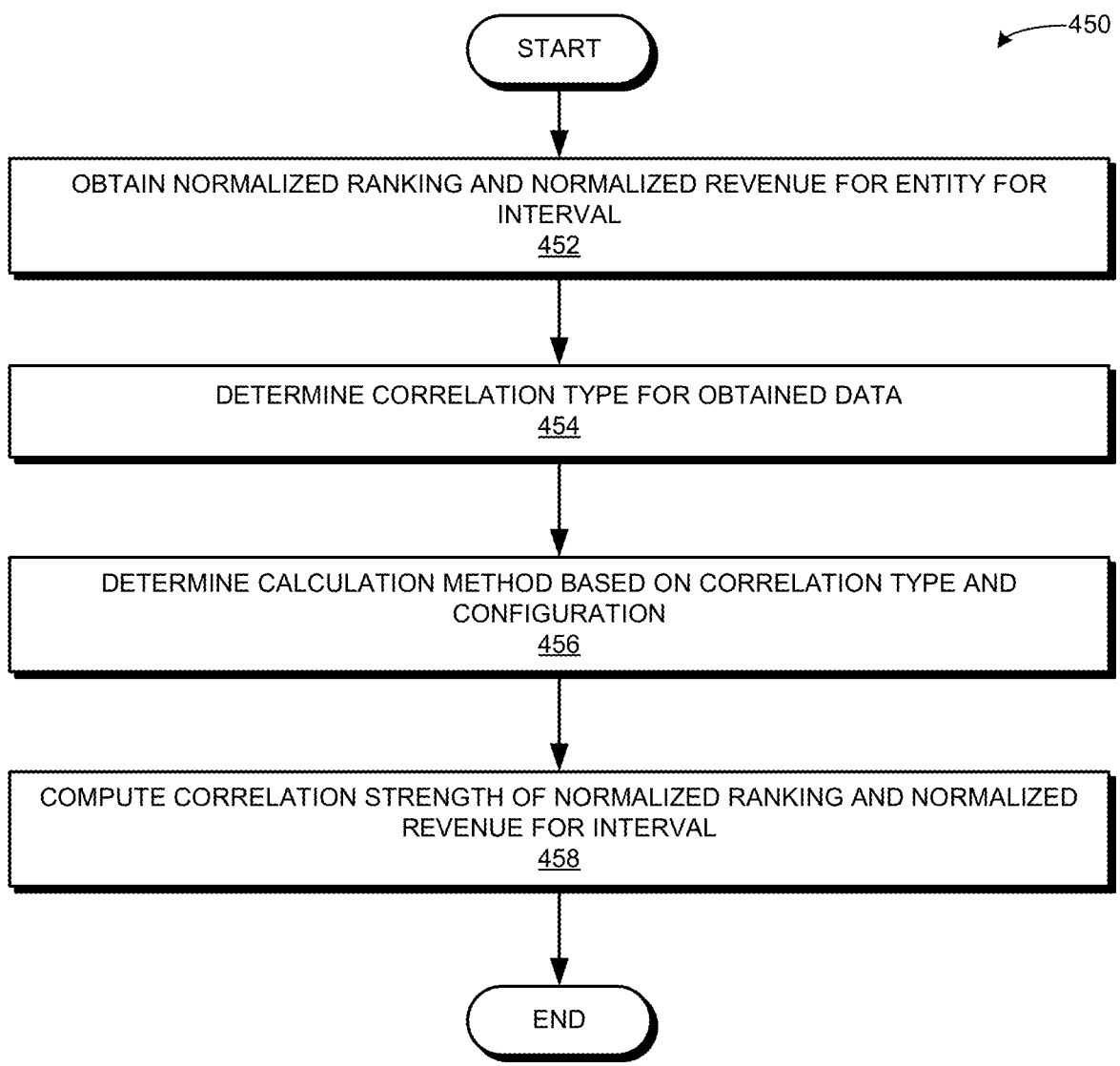
FIG. 4C presents a flowchart illustrating a method for computing correlation strength for non-parametric correlation analysis, in accordance with an embodiment of the present invention.

FIG. 4C presents a flowchart illustrating a method for computing correlation strength for non-parametric correlation analysis, in accordance with an embodiment of the present invention. During operation, a non-parametric correlation analysis system obtains a normalized ranking and a normalized revenue for the entity for the interval (operation 452) and determines a correlation type for the obtained data (operation 454). The system determines a calculation method based on the correlation type and a configuration (operation 456). The system then computes a correlation strength of the normalized ranking and normalized revenue for the interval (operation 458).

Presentation Interface

Figure 5:
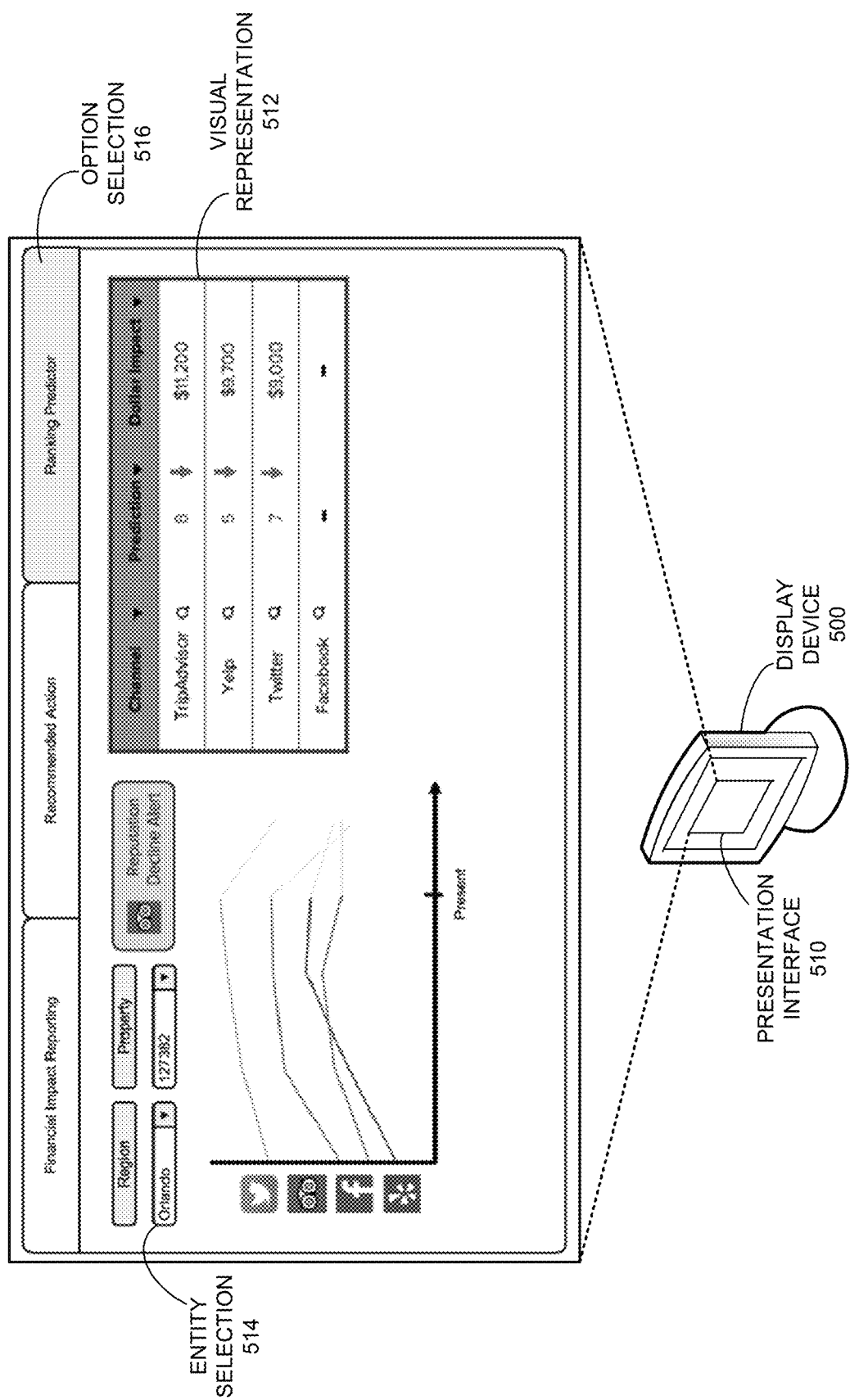
FIG. 5 illustrates an exemplary presentation interface of a non-parametric correlation analysis system, in accordance with an embodiment of the present invention.

In the example of FIGS. 1A and 1B, correlation computation module 168 calculates the correlation between rankings and revenues. To make the calculated correlation available to a user, system 160 may provide the calculated correlation via a presentation interface. FIG. 5 illustrates an exemplary presentation interface of a non-parametric correlation analysis system, in accordance with an embodiment of the present invention. In this example, a display device 500 can display a presentation interface 510, which provides a visual representation 512 of the non-parametric correlation analysis. In some embodiments, presentation interface 510 can be a graphical user interface (GUI).

Presentation interface 510 can include a visual representation 512, which represents the insights obtained from the correlation. For example, visual representation 512 can include a table and/or a plot showing correlation between ranking and corresponding revenue at difference points of time. Such a plot can include rankings from different distributed services (e.g., TripAdvisor, Facebook, Twitter, Yelp, etc.). Presentation interface 510 can further include one or more selectors for selecting an entity (e.g., an area and a specific business). Presentation interface 510 can also include an option selection 516 (e.g., financial reporting, recommended action, and ranking predictor, etc).

Presentation interface 510 can be an interface for a computing device (e.g., a monitor of a desktop or laptop), or an adjusted interface for a cellular (e.g., a cell phone or a tablet) device. Examples of a presentation interface include, but are not limited to, a graphical user interface (GUI), a text-based interface, and a web interface.

Exemplary Computer and Communication System

Figure 6:
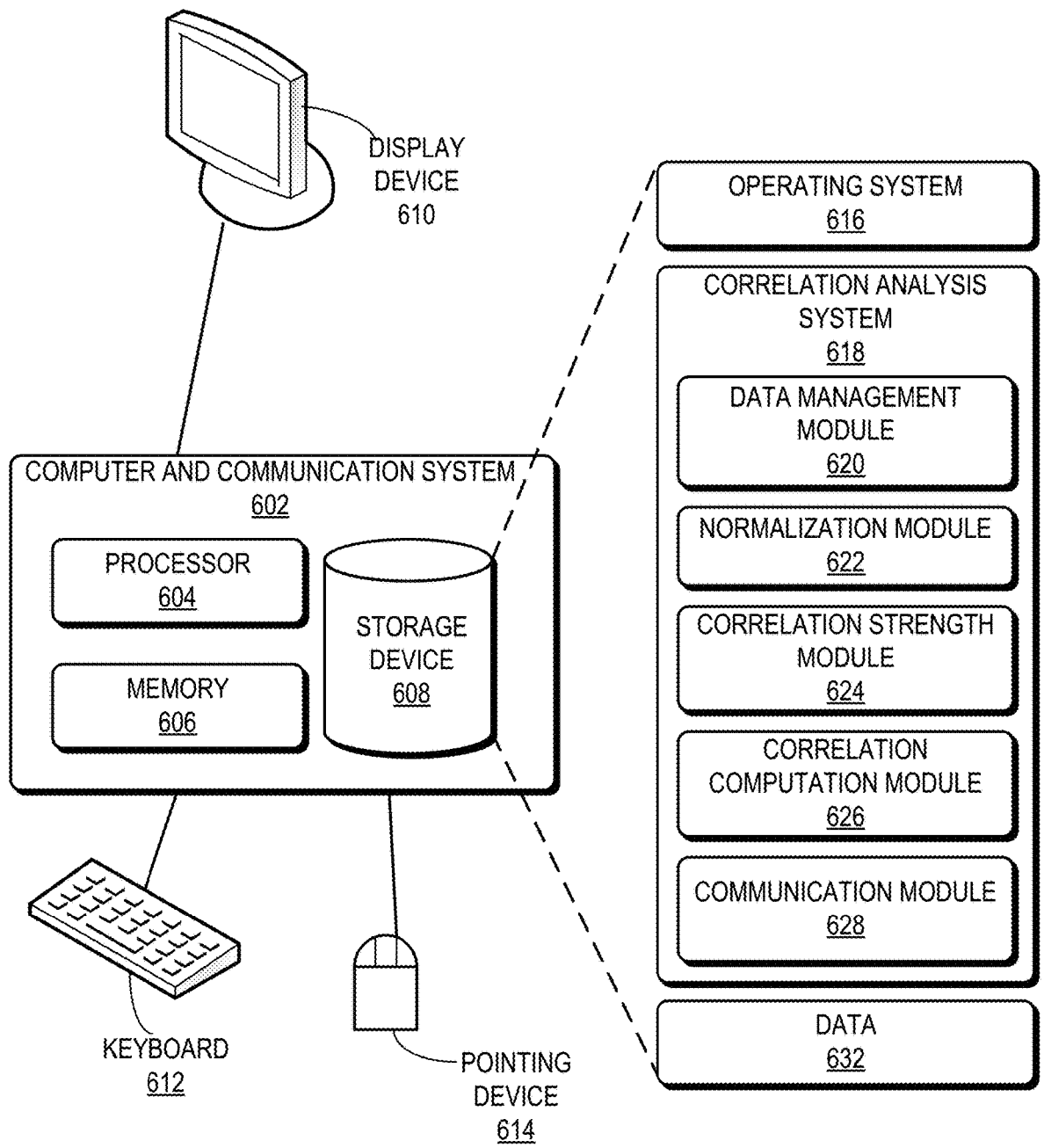
FIG. 6 illustrates an exemplary computer and communication system that facilitates non-parametric correlation analysis in user reviews, in accordance with an embodiment of the present invention.

FIG. 6 illustrates an exemplary computer and communication system that facilitates non-parametric correlation analysis in user reviews, in accordance with an embodiment of the present invention. A computer and communication system 602 includes a processor 604, a memory 606, and a storage device 608. Memory 606 can include a volatile memory (e.g., RAM) that serves as a managed memory, and can be used to store one or more memory pools. Furthermore, computer and communication system 602 can be coupled to a display device 610, a keyboard 612, and a pointing device 614. Storage device 608 can store an operating system 616, a correlation analysis system 618, and data 632.

Correlation analysis system 618 can include instructions, which when executed by computer and communication system 602, can cause computer and communication system 602 to perform the methods and/or processes described in this disclosure. Correlation analysis system 618 includes instructions for determining a correspondence between a ranking and a corresponding revenue information for a point of time (data management module 620). Correlation analysis system 618 can also include instructions for determining a type for the obtained reviews for normalization (data management module 620).

Correlation analysis system 618 further includes instructions for determining normalized rankings and revenues (normalization module 622). Correlation analysis system 618 can also include instructions for computing correlation strength for an interval (correlation strength module 624). Correlation analysis system 618 can include instructions for computing the correlation for a period of time (correlation computation module 626). Correlation analysis system 618 can also include instructions for exchanging information with other devices (communication module 628). Data 632 can include any data that is required as input or that is generated as output by the methods and/or processes described in this disclosure.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented method for nonparametric correlation analysis from user reviews, the method comprising:

storing digital content associated with online reviews and further storing digital content associated with earning information for a plurality of business entities on network-based non-transitory storage devices, wherein the online reviews are received from social media outlets via a plurality of applications running on a plurality of platforms from a plurality of online distributed services that manage online reviews;

providing remote access to users over a network so that any one of the users can view non-parametric correlations between online reviews and earnings information through a presentation interface, wherein a business entity is selected using a graphical control element rendered on a graphical user interface via the presentation interface;

obtaining, for the business entity, a set of online reviews for a service and earning information for a period of time from one or more network packets transmitted from the network-based non-transitory storage devices;

extracting, by a computer, rankings from the set of online reviews and revenues from the earning information; and executing, by the computer, a non-parametric correlation analysis model for ascertaining non-parametric correlations between the rankings and the revenues that are derived independent of distribution assumptions and calculating correlation strengths for data points representing a change in rankings and corresponding revenues, wherein the calculated correlation strengths are obtained between any two points in time within the period of time, the nonparametric correlation analysis model executed by:

determining respective correspondence between the rankings and revenues for a plurality of points of time in the period of time;

normalizing the extracted rankings and revenues with respect to rankings and revenues, respectively, of plurality of business entities that offer the service within a predetermined price range of the service of the business entity;

determining, from the normalized rankings, a first normalized ranking and a second normalized ranking for a first point of time and a second point of time, respectively, in the plurality of points of time;

determining, from the normalized revenues, a first normalized revenue and a second normalized revenue for the first point of time and the second point of time, respectively;

determining a first correlation strength between a change between the first and second normalized rankings and a change between the first and second normalized revenues based on the correspondence between rankings and revenues wherein the first correlation strength is associated with the first point of time and the second point of time;

determining a correlation between the extracted rankings and corresponding extracted revenues based on a plurality of correlation strengths over the period of time, wherein the plurality of correlation strengths includes the first correlation strength; generating, by the computer, display data to show a visual representation of the determined correlation between the extracted rankings and corresponding extracted revenues at different points in time within the period of time on the presentation interface reflective of correlation between social reputation of the business entity online to its revenue; and displaying the visual representation on the presentation interface.

2. The method of claim 1, wherein normalizing the extracted rankings comprises:

determining the plurality of business entities similar to the business entity based on the predetermined price range;

calculating a relative ranking of the business entity compared to rankings of members of the plurality of business entities based on an original ranking of the business entity at a respective point of time in the period of time; and computing a normalized ranking for the point of time based on the relative ranking and a cardinality of the plurality of business entities.

3. The method of claim 2, wherein the plurality of business entities has locations within a predetermined distance from the business entity.

4. The method of claim 1, wherein normalizing the extracted revenues comprises:

determining, for the business entity, a maximum and a minimum revenue for the period of time based on the obtained earning information;

obtaining an original revenue of the business entity at the first a respective point of time in the period of time; and computing a normalized revenue for the point of time based on the original revenue, and the maximum and minimum revenues of the business entity.

5. The method of claim 1, wherein the correlation over the period of time includes computing an average, minimum, maximum, or median of the plurality of correlation strengths over the period of time.

6. The method of claim 1, wherein determining a first correlation strength comprises:

determining a correlation type for the change between the first and second normalized rankings and the change between the first and second normalized revenues;

determining a correlation strength calculation method based on the correlation type; and computing the first correlation strength based on the determined correlation strength calculation method.

7. The method of claim 6, wherein the correlation strength calculation method is a penalty-based correlation strength calculation method comprising a first computation method for a positive correlation type and a second computation method for a negative correlation type, wherein the first and second computation methods include computing the first correlation strength based on:

a first angle between a first vector representing the change between the first and second normalized rankings and a second vector representing the change between the first and second normalized revenues; and a second angle between the second vector and a third vector representing an average revenue change for the plurality of business entities at the first and second points of time.

8. The method of claim 6, wherein the correlation strength calculation method is a binary correlation strength calculation method comprising a third computation method for a positive correlation type and a zero value for a negative correlation type, wherein the third computation method includes computing the first correlation strength based on an absolute value of the difference between the change between the first and second normalized rankings and the change between the first and second normalized revenues.

9. A computer system for non-parametric correlation analysis, the system comprising:

a processor;

a plurality of business entities on network-based non-transitory storage devices for storing digital content associated with online reviews and further storing digital content associated with earning information, wherein the online reviews are received from social media outlets via a plurality of applications running on a plurality of platforms from a plurality of online distributed services that manage online reviews; and a storage device storing instructions that when executed by the processor cause the processor to perform a method, the method comprising:

providing remote access to users over a network so that any one of the users can view non-parametric correlations between online reviews and earnings information through a presentation interface, wherein a business entity is selected using a graphical control element rendered on a graphical user interface via the presentation interface;

obtaining, for the business entity, a set of online reviews for a service and earning information for a period of time from one or more network packets transmitted from the network-based non-transitory storage devices extracting, by a computer, rankings from the set of online reviews and revenues from the earning information;

executing, by the computer, a non-parametric correlation analysis model for ascertaining non-parametric correlations between the rankings and the revenues that are derived independent of distribution assumptions and calculating correlation strengths for data points representing a change in rankings and corresponding revenues, wherein the calculated correlation strengths are obtained between any two points in time within the period of time, the nonparametric correlation analysis model executed by:

determining respective correspondence between the rankings and revenues for a plurality of points of time in the period of time;

normalizing the extracted rankings and revenues with respect to rankings and revenues, respectively, of a plurality of business entities that offer the service within a predetermined price range of the service of the business entity;

determining, from the normalized rankings, a first normalized ranking and a second normalized ranking for a first point of time and a second point of time, respectively, in the plurality of points of time;

determining, from the normalized revenues, a first normalized revenue and a second normalized revenue for the first point of time and the second point of time, respectively;

determining a first correlation strength between a change between the first and second normalized rankings and a change between the first and second normalized revenues based on the correspondence between rankings and revenues, wherein the first correlation strength is associated with the first point of time and the second point of time; and determining a correlation between the extracted rankings and corresponding extracted revenues based on a plurality of correlation strengths over the period of time, wherein the plurality of correlation strengths includes the first correlation strength;

generating, by the computer, display data to show a visual representation of the determined correlation between the extracted rankings and corresponding extracted revenues at different points in time within the period of time on the presentation interface reflective of correlation between social reputation of the business entity online to its revenue; and displaying the visual representation on the presentation interface.

10. The computer system of claim 9, wherein normalizing the extracted rankings comprises:

determining the plurality of business entities based on the predetermined price range;

calculating a relative ranking of the business entity compared to rankings of members of the plurality of business entities based on an original ranking of the business entity at a respective point of time in the period of time; and computing normalized ranking for the point of time based on the relative ranking and a cardinality of the plurality of business entities.

11. The computer system of claim 10, wherein the plurality of business entities has locations within a predetermined distance from the business entity.

12. The computer system of claim 9, wherein normalizing the extracted revenues comprises:

determining, for the business entity, a maximum and a minimum revenue or the period of time based on the obtained earning information;

obtaining an original revenue of the business entity at a respective point of time in the period of time; and computing a normalized revenue for the point of time based on the original revenue, and the maximum and minimum revenues of the business entity.

13. The computer system of claim 9, wherein determining the correlation over the period of time includes computing an average, minimum, maximum, or median of the plurality of correlation strengths over the period of time.

14. The computer system of claim 9, wherein determining a first correlation strength comprises:

determining a correlation type for the change between the first and second normalized rankings and the change between the first and second normalized revenues;

determining a correlation strength calculation method based on the correlation type; and computing the first correlation strength based on the determined correlation strength calculation method.

15. The computer system of claim 14, wherein the correlation strength calculation method is a penalty-based correlation strength calculation method comprising a first computation method for a positive correlation type and a second computation method for a negative correlation type, wherein the first and second computation methods include computing the first correlation strength based on:

a first angle between a first vector representing the change between the first and second normalized rankings and a second vector representing the change between the first and second normalized revenues; and a second angle between the second vector and a third vector representing an average revenue change for the plurality of business entities at the first and second points of time.

16. The computer system of claim 14, wherein the correlation strength calculation method is a binary correlation strength calculation method comprising a third computation method for a positive correlation type and a zero value for a negative correlation type, wherein the third computation method includes computing the first correlation strength based on an absolute value of the difference between the change between the first and second normalized rankings and the change between the first and second normalized revenues.

17. A non-transitory computer-readable storage medium storing instructions that when executed by a computer cause the computer to perform a method, the method comprising:

storing digital content associated with online reviews and further storing digital content associated with earning information for a plurality of business entities on network-based non-transitory storage devices, wherein the online reviews are received from social media outlets via a plurality of applications running on a plurality of platforms from a plurality of online distributed services that manage online reviews;

providing remote access to users over a network so that any one of the users can view non-parametric correlations between online reviews and earnings information through a presentation interface, wherein a business entity is selected using a graphical control element rendered on a graphical user interface via the presentation interface;

obtaining, for the business entity, a set of online reviews for a service and earning information for a period of time from one or more network packets transmitted from the network-based non-transitory storage devices;

extracting, by a computer, rankings from the set of online reviews and revenues from the earning information; and executing, by the computer, a non-parametric correlation analysis model for ascertaining non-parametric correlations between the rankings and the revenues that are derived independent of distribution assumptions and calculating correlation strengths for data points representing a change in rankings and corresponding revenues, wherein the calculated correlation strengths are obtained between any two points in time within the period of time, the nonparametric correlation analysis model executed by:

determining respective correspondence between the rankings and revenues for a plurality of points of time in the period of time;

normalizing the extracted rankings and revenues with respect to rankings and revenues, respectively, of plurality of business entities that offer the service within a predetermined price range of the service of the business entity;

determining, from the normalized rankings, a first normalized ranking and a second normalized ranking for a first point of time and a second point of time, respectively, in the plurality of points of time;

determining, from the normalized revenues, a first normalized revenue and a second normalized revenue for the first point of time and the second point of time, respectively;

determining a first correlation strength between in a change between the first and second normalized rankings and a change between the first and second normalized revenues based on the correspondence between rankings and revenues, wherein the first correlation strength is associated with the first point of time and the second point of time;

determining a correlation between the extracted rankings and corresponding extracted revenues based on a plurality of correlation strengths over the period of time, wherein the plurality of correlation strengths includes the first correlation strength;

generating, by the computer, display data to show a visual representation of the determined correlation between the extracted rankings and corresponding extracted revenues at different points in time within the period of time on the presentation interface reflective of correlation between social reputation of the business entity online to its revenue; and displaying the visual representation on the presentation.

18. The storage medium of claim 17, wherein normalizing the extracted rankings comprises:

determining the plurality of business entities based on the predetermined price range;

calculating a relative ranking of the business entity compared to rankings of members of the plurality of business entities based on an original ranking of the business entity at a respective point of time in the period of time; and computing a normalized ranking for the point of time based on the relative ranking and a cardinality of the plurality of business entities.

19. The storage medium of claim 17, wherein normalizing the extracted revenues comprises:

determining, for the business entity, a maximum and a minimum revenue for the period of time based on the obtained earning information;

obtaining an original revenue of the business entity at a respective point of time in the period of time; and computing a normalized revenue for the point of time based on the original revenue, and the maximum and minimum revenues of the business entity.

20. The storage medium of claim 17, wherein determining a first correlation strength comprises:

determining a correlation type for the change between the first and second normalized rankings and the change between the first and second normalized revenues;

determining a correlation strength calculation method based on the correlation type; and computing the first correlation strength based on the determined correlation strength calculation method.

* * * * *